3,112,154
Patented Nov. 26, 1963

3,112,154
METHOD OF FLAMEPROOFING CELLULOSE FIBERS AND PRODUCTS PRODUCED THEREBY
Roger C. Steinhauer, Park Forest, Ill., assignor to Stauffer Chemical Company, New York, N.Y., a corporation of Delaware
No Drawing. Original application Oct. 20, 1958, Ser. No. 768,041, now Patent No. 3,029,283, dated Apr. 10, 1962. Divided and this application Oct. 28, 1959, Ser. No. 849,173
8 Claims. (Cl. 8—115.6)

This invention relates to the method of treating cellulosic materials with the reaction product produced by reacting ethylenediamine with the product produced by reacting under anhydrous conditions anhydrous ammonia and a phosphoric acid anhydride, and cellulosic materials that have been treated with said reaction product.

The complex nitrogen-phosphorus containing reaction products (anhydrous ammonia-phosphoric acid anhydride reaction product) which serve, along with the ethylenediamine, as a reactant for the preparation of the alkyleneamino derivatives which I use in treating cellulosic materials may be any of the compositions resulting from the reaction, under anhydrous conditions, of anhydrous $NH_3$ and a phosphoric acid anhydride (forms phosphoric acid when added to water) selected from the group consisting of phosphorus pentoxide ($P_2O_5$) and phosphorus oxychloride ($POCl_3$), wherein the atom ratio of total nitrogen to phosphorus in the anhydrous ammonia-phosphoric acid anhydride reaction product is within the range of 1–3 to 1 with at least one amide nitrogen bonded directly to at least one phosphorus atom. These reaction products contain at least one ≡P—NH—, ≡P—NH$_2$ or an ≡P=N— group.

I have found that such products may be treated (reacted or condensed) with ethylenediamine with liberation of $NH_3$ to yield an amino derivative containing an increased number of reactive amino groups over those present in the starting anhydrous product of $NH_3$ with $P_2O_5$ or $POCl_3$. These new amino derivatives are exceptionally valuable for use in the flameproofing of cellulosic material, especially cellulose fibers or fabrics in which permanency of the flameproof properties under repeated laundering cycles is desired.

Suitable anhydrous ammonia-phosphorus pentoxide reaction product starting materials may be made by any of several known methods. For example, solid phosphorus pentoxide may be reacted with liquid anhydrous ammonia in the manner described in U.S. Patent No. 2,163,085, or by reacting a suspension of $P_2O_5$ in an inert liquid medium with an excess of gaseous anhydrous $NH_3$ as described in U.S. Patent No. 2,122,122, or, preferably, by burning elemental phosphorus with dry air to produce $P_2O_5$ substantially in vapor form and immediately reacting such $P_2O_5$ with gaseous anhydrous $NH_3$ in excess amount over that which will react with the $P_2O_5$, and separating the reaction product in the form of a finely-divided, white granular product. While such products have been produced and used commercially for some time, their exact chemical composition and structure is not known. However, it is known that such reaction products contain both ammoniacal and nuclear or amide nitrogen components. Further, it is known that at least part of the reaction product is in a polymerized form. Theoretically, a large number of possible chemical structural formulas can be drawn for reaction products having the same reacting proportions of anhydrous $NH_3$ and $P_2O_5$, and it is highly probable that the reaction product is a mixture of several different compounds having different structural formulas and degrees of polymerization. Chemical analysis shows such reaction products to contain from:

70–80% $P_2O_5$;
5–10% nuclear or amide nitrogen; and
12–18% free or ammoniacal nitrogen.

Such products have a total nitrogen to phosphorus atomic ratio between 1 and 2.

Suitable anhydrous $NH_3$—$POCl_3$ reaction product starting materials may be prepared by any one of the processes described in the prior art, such as shown in U.S. Patent 2,582,181, U.S. Patent 2,596,935, and British Patent 770,789 (March 27, 1957). The initial reaction product probably forms in accordance with the equation:

$$3NH_4Cl + POCl_3 \rightarrow PO(NH_2)_3 + 2NH_4Cl$$

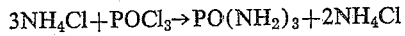

After removal of the $NH_4Cl$, the remaining phosphoric triamide is a suitable starting material for the new products of the present invention. Additional starting materials of more complex structure are represented by the complex nitrogen-phosphorus compounds resulting from the heat decomposition and polymerization products resulting from the heating of the initial phosphoric triamide compound.

The above described starting materials have in common reactive amido groups =NH and —$NH_2$ bonded to phosphorus atoms. It has been found that these reactive amido groups may be reacted under suitable conditions with ethylenediamine with liberation of ammonia to form complex derivatives which have excellent affinity for cellulosic materials and excellent flameproofing properties, possibly reacting with cellulosic materials or derivatives.

While I do not wish to be held to any particular theory, it is believed that the reaction between the above described anhydrous ammonia-phosphoric acid anhydride starting materials and the ethylenediamine proceeds in accordance with one of the following type equations:

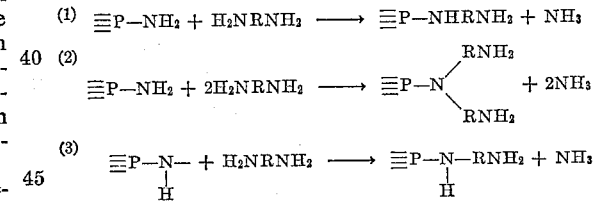

(1) ≡P—NH$_2$ + H$_2$NRNH$_2$ ⟶ ≡P—NHRNH$_2$ + NH$_3$ (2) ≡P—NH$_2$ + 2H$_2$NRNH$_2$ ⟶ ≡P—N(RNH$_2$)(RNH$_2$) + 2NH$_3$ (3) ≡P—N(H)— + H$_2$NRNH$_2$ ⟶ ≡P—N(H)—RNH$_2$ + NH$_3$ where R represents an ethylene group.

In view of the uncertain structure of the starting anhydrous $NH_3$—$P_2O_5$ and anhydrous $NH_3POCl_3$ reaction products, it is not possible to designate a definite structural formula to any of the new compounds, except possibly for the derivative of the phosphoric triamide, the one member of the starting compounds which I believe has a definite structure. For purpose of illustration and postulation only, I believe that the reaction product of phosphoric triamide and an excess of ethylenediamine, for example, would have the formula

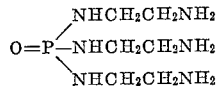

$$O=P \begin{cases} NHCH_2CH_2NH_2 \\ NHCH_2CH_2NH_2 \\ NHCH_2CH_2NH_2 \end{cases}$$

or some modification thereof, including possible ring structures resulting from further interaction of the amino groups.

In producing the new products for treating cellulosic material, the anhydrous $NH_3$—$P_2O_5$ or anhydrous $NH_3$—$POCl_3$ reaction products and the ethylenediamine were mixed together in a reaction vessel and the mixture heated and maintained at such reaction temperatures as to cause condensation and the liberation of $NH_3$ gas. When substantial evolution of ammonia had ceased, the reaction mass was allowed to cool, thereby forming a product which ranges from a soft granular solid to a hard glass-like solid as the amount of ethylenediamine is increased from one to three mols. The new products have been found to be somewhat hygroscopic and soluble in water.

*Example I*

One hundred grams of an anhydrous $NH_3$—$P_2O_5$ reaction product (i.e., produced by burning elemental phosphorus with dry air to produce $P_2O_5$ substantially in vapor form, immediately reacting the $P_2O_5$ with gaseous $NH_3$ in excess amount over that which will react with the $P_2O_5$, and separating the reaction product in the form of a white, finely-divided product) having an analysis of 73.55% $P_2O_5$, 6.58% nuclear or amide nitrogen, and 13.22% free or ammonium nitrogen, were mixed with 200 grams of ethylenediamine (95–100%) in a 500 ml. flask fitted with a heating mantle, condenser and thermocouple. The mantle, condenser and thermocouple serve to heat the reactants, condense ethylenediamine vapors and record temperatures, respectively.

The reaction mixture was heated gradually to 115–120° C. over a period of several hours. Ammonia began to be evolved when the temperature reached the 40–50° C. range, and continued to be evolved during most of the reaction. The reaction mixture was held within the temperature range of 115–120° C. for 2½ to 3 hours and then allowed to cool to room temperature.

After cooling, the reaction product separated at the bottom of the reaction vessel as a solid glass-like material. The upper layer comprising the excess ethylenediamine was poured off. The glass-like product was removed from the vessel, placed under methanol and broken up into small pieces. After filtering off the methanol, the product was again washed with a second portion of methanol, filtered, and dried in a vacuum desiccator.

The product was a white, glass-like hygroscopic material having an analysis of: 50.2% $P_2O_5$; 22.9% total nitrogen; and 4.2% nitrogen being ammonium nitrogen. Chromatographic analysis (following the procedure set forth in "Use of Paper Chromatolgy for Differential Analysis of Phosphate Mixtures," Analytical Chemistry, vol. 28, No. 7, page 1091, July 1956), indicated the presence of a mixture of polymers of different phosphorus atom chain lengths or arrangements corresponding approximately to reference determinations for the following:

8.8% $P_2O_5$ ortho;
17.0% $P_2O_5$ pyro;
11.0% $P_2O_5$ tripoly; and
13.4% $P_2O_5$ trimeta.

In the foregoing Example I the anhydrous ammonia-phosphoric acid anhydride reactant was prepared by the reaction of anhydrous ammonia and the anhydride $P_2O_5$, and had an amido nitrogen content of approximately 6.5%. Starting reactants of higher amido nitrogen content may be utilized when the anhydrous ammonia-phosphoric acid anhydride product is prepared by reacting anhydrous ammonia and the anhydride $POCl_3$. Depending on the heating conditions employed, such anhydrous ammonia-phosphoric acid anhydride product may contain up to a theoretical value of 44.2% amido nitrogen for substantially pure phosphoric triamide. From a practical standpoint it is uneconomical, for the present purpose, to prepare the substantially pure phosphoric triamide for use for the purpose of reacting same with ethylenediamine in the present invention. The difficulty in preparing phosphoric triamide resides in the separation of water-soluble triamide from the water-soluble ammonium chloride formed in accordance with the following equation:

$$POCl_3 + 6NH_3 \rightarrow PO(NH_2)_3 + 3NH_4Cl$$

One means of separation involves dissolving out the ammonium chloride with liquid anhydrous $NH_3$ in which the triamide is substantially insoluble. However, if the reaction of the $POCl_3$ and $NH_3$ is carried out at a higher temperature (of the order of 150° C. or above) a complex or polymeric phosphorus-nitrogen containing reaction product is formed which is insoluble in water and may be easily separated from the by-product $NH_4Cl$. Such a product is quite suitable for further reaction with ethylenediamine to produce products which fall within the present invention.

The functional nature of the reactions of the amido nitrogen of the anhydrous ammonia-phosphoric acid anhydride reaction product is well illustrated in the following example wherein a substantially pure phosphoric triamide is reacted (includes condensation reaction) with ethylenediamine to produce a product having a reasonably definite composition.

*Example II*

One hundred grams of ethylenediamine was placed in a 200 ml. reaction flask and 19.0 grams (0.2 mole) of substantially pure phosphoric triamide was slowly added with stirring to form a smooth slurry. No reaction occurred in the cold. However, when the reaction mixture was slowly heated, ammonia started to come off at about 45–50° C. and continued to be evolved as the tempreature was raised to 110° C. The temperature was held at about 110° C. for about 3 hours and then allowed to cool to room temperature thereby forming a clear homogeneous liquid. The excess ethylenediamine was distilled off at 5 mm. Hg and 40–50° C. thereby yielding a very viscous liquid product having a faint amine odor.

The product is believed to have been formed in accordance with the following reaction:

$$PO(NH_2)_3 + 3H_2NCH_2CH_2NH_2 \rightarrow PO(NHCH_2CH_2NH_2)_3 + 3NH_3$$

Analysis and yield of the product were as follows:

|  | Product Formed | Theoretical |
|---|---|---|
| Phosphorus, percent | 12.8 | 13.8 |
| Nitrogen (total), percent | 34.1 | 37.5 |
| Nitrogen (free), percent | 0.7 | 0.0 |
| Uniform composition (chromatographic), percent | 99.0 | 100.0 |
| Yield, g | 45.8 | 41.8 |

This analysis suggests or confirms the general nature of the reaction involved in the preparation of the new condensation products of the present invention.

These new products, whether produced from $NH_3$—$P_2O_5$ or $NH_3$—$POCl_3$ starting reaction products have at least one ethylenediamine group bonded through a nitrogen atom to at least one phosphorus atom and may have as many as three such groups per atom of phosphorus.

While the anhydrous ammonia-phosphoric acid anhydride reaction products are known to have utility for the flameproofing of cellulosic fabrics, etc., the new condensation products that result from their reaction with ethylenediamine have a much improved, permanent flameproofing effect. Cellulose fabrics flameproofed with the new condensation products have a softer "hand" and are much more permanently flameproofed against repeated laundering cycles. These improved results are believed to be due to a greater chemical affinity of the alkyleneamine groups with the cellulose molecules of the fabric.

While I do not wish to be held to any particular theory, it is believed that under proper heating and curing conditions some of the organic amine groups react with some of the hydroxyl groups of the cellulose molecule to form permanent chemical bonds, thereby changing the normal decomposition characteristics of the cellulose when it is subjected to charring temperatures. Chemical bonding of the flameproofing agent is indicated by the softness of the treated fabric and the retention of the flameproofing properties of the fabric after it is subjected to a large number of laundering cycles.

Another suggested theory is that the organic amine groups of the new flameproofing agents cause them to become attached to the cellulose fibers in much the same manner as dyes become attached to cellulose fibers. There is some evidence to support this latter theory in that a mordanting pretreatment of the cellulose fibers increases the effectiveness of the flameproofing treatment. Again, I do not wish to be held to this suggested theory.

In the flameproofing procedure, the cellulosic fibers or fabric are saturated with an aqueous solution of the ethylenediamine condensation product of an anhydrous $NH_3$—$P_2O_5$ or anhydrous $NH_3$—$POCl_3$ reaction product. Excess treating solution is allowed to drain off and the fabric dried at about 100–110° C., after which it is cured for about 10–15 minutes at a temperature of about 150° C. At this point, the add-on or increase in weight of the fabric should be between 15% and 30%. The fabric is then rinsed for about 5 to 10 minutes in warm water to remove the excess treating material and restore the original "hand." Cloth treated in this manner has excellent flameproof characteristics, even after 10 or more laundering cycles.

For example, an eight ounce cotton twill cloth treated with a 20% (by weight) aqueous solution of the product of Example I had an add-on of 27.0% after drying at 100–110° C. After curing at 150° C. for 15 minutes, the fabric was rinsed with water and dried. The treated fabric had an excellent "hand" and was flameproofed. Even after 15 laundering cycles with a "light duty wash," the fabric passed the Quartermaster Bunsen Flame Test with an 11 second flame time and a 4.5 inch char length. The fabric just failed to pass the test after 10 laundering cycles with a "heavy duty wash," probably due to ion exchange between the sodium ions of the detergent and the amine or ammonium ions of the flameproofing agent attached to the fibers of the fabric.

The term "light duty wash" consists of washing a 3½ x 14" piece of the treated cloth in 200 ml. of a 0.5% (by weight) sodium N-methyl N-oleyl taurate aqueous solution of zero water hardness at a temperature of 140° F. for a period of 15 minutes per washing cycle.

The term "heavy duty wash" consists of washing a 3½" x 14" piece of the treated cloth in 200 ml. of a 0.5% (by weight) solution of a commercial detergent having approximately the following composition:

| | Percent |
|---|---|
| Tetrasodium pyrophosphate | 8 |
| Sodium tripolyphosphate | 39 |
| Disodium phosphate | 2 |
| Sodium sulfate | 16 |
| Sodium silicate ($Na_2O.3SiO_2$) | 5 |
| Sodium dodecylbenzene sulfonate | 20 |
| Carboxymethyl cellulose and water | 10 | using water of 300 p.p.m. hardness. Each washing cycle was carried out at 140° F. for a 15 minute period.

After each of above washes the fabric was rinsed with distilled water and the cycle repeated with fresh detergent solution for the number of laundering cycles indicated.

The Bunsen flame test was carried out in accordance with the method described in Federal Specification CCC–T–191–b. Briefly, the test consists in applying a Bunsen gas flame for a period of 12 seconds under the center of the bottom edge of a 3" wide 10" long strip of the test fabric held in a vertical position. The time required for the flame to extinguish itself within the 12 second period and the length of the charred portion of the fabric are determined. Generally, a char length of less than 5 inches and a burning time of less than 12 seconds are considered as representing a satisfactory degree of flameproofness.

In the procedure of flameproofing the cellulosic fabric, it has been found that the treated cloth must be cured at a sufficient temperature to effect adequate combination or attachment of the flameproofing agent with the fibers of the cloth. For example, an army cotton twill treated with a 25.7% add-on of the composition of Example I and cured 15 minutes at 125° C. was not sufficiently flameproof after 15 light duty laundering cycles to be self-extinguishing, although it did not burn completely to an ash but remained as a charred strip up the middle of the test piece. A similar test piece of the treated fabric was cured at 150° C. for 15 minutes, and was found to have a burning time of 11 seconds and a char length of only 4.5 inches after 15 light duty laundering cycles. Similarly a test strip treated with a 23.9% add-on, and cured at 160° C. for 10 minutes gave a burning time of 12 seconds and a 6 inch char length. Curing at 170° C. produced some discoloration of the fabric and therefore was considered too high for satisfactory treatment. Thus the proper curing temperature is within the range of 125–170° C., preferably from about 150° C. to about 160° C.

An eight ounce cotton twill cloth was saturated with a 20% aqueous solution of the product of Example II, the excess solution allowed to drain off and then dried at 100–110° C. The add-on was 18.8% by weight of the cloth. After curing 15 min. at 150° C. and rinsing with water and drying, the resulting fabric was quite flameproof with substantially no change in the feel ("hand") from that of the original untreated cloth. After 10 laundering cycles with light duty washes the fabric remained flameproof with a burning time of 10 seconds and a char length of 5.25 inches.

The above examples have illustrated the production and use of reaction products involving the reaction of an excess of ethylenediamine with the anhydrous ammonia-phosphoric acid anhydride product. In such reaction products, it is assumed that all reactable amido groups of the complex nitrogen-phosphorus starting compounds have been reacted with ethylenediamine. It is equally clear that less than theoretical amounts of ethylenediamine may be reacted with the complex anhydrous ammonia-phosphoric acid anhydride starting materials. Thus, in the case of the phosphoric triamide starting material, which contains, theoretically, the largest number of nitrogen to phosphorus bonds per atom of phosphorus, it is possible to react from 1 to 3 moles of ethylenediamine with one mole of phosphoric triamide. Such reaction products have been made under the general procedures described above, and such products have been found to be excellent permanent flameproofing agents. Similar reaction products have been made by reacting a typical anhydrous ammonia-$P_2O_5$ reaction product with less than the complete reaction proportion of ethylenediamine. Typical examples follow:

*Example III*

28.5 grams of phosphoric triamide was mixed with 18.0 grams of ethylenediamine (one-third complete reaction proportion) forming a sticky gummy mass which was placed in 300 ml. flask and heated at 100–110° C. for three hours. The reaction product was allowed to cool to room temperature. The resulting low ratio ethylenediamine to phosphoric triamide reaction product was a soft greyish white solid that was quite hygroscopic. Analysis showed 52.2% $P_2O_5$, 32.3% total nitrogen and 2.5% ammonium nitrogen. Chromatographic analysis (based on the above referred to procedure) showed distribution of the phosphorus atoms in molecules of different size or structure corresponding to reference determinations for

| | Percent |
|---|---|
| Orthophosphate | 11.1 |
| Pyrophosphate | 28.9 |
| Tripolyphosphate | 28.6 |
| Tetraphosphate | None |
| Trimetaphosphate | None |
| Pentaphosphate | None |
| Higher phosphate | 31.4 |
| Higher phosphate polymers | None |

Quite obviously, this reaction product represents a mixture of complex components of indeterminate structure and can be designated only as a reaction product. Such a reaction product differs in composition from that obtained in the reaction product of Example II wherein an excess of the ethylenediamine was employed in the reaction. I believe, although I do not wish to be held to any theory, that in the case where less than sufficient amounts of ethylenediamine are reacted than necessary for complete reaction with all amido groups of the starting phosphorus-nitrogen material, that the unreacted amido groups undergo condensation or polymerization reactions to yield varying proportions of complex reaction products of indeterminate composition and structure. Surprisingly, such reaction products have excellent flameproofing characteristics which are essentially equivalent over the range of reacting proportions of the ethylenediamine to the phosphoric triamide from one-third to the full amount of ethylenediamine which can be reacted when employing a large excess of the ethylenediamine.

Similar variations in the reacting proportions of ethylenediamine with anhydrous ammonia-$P_2O_5$ reaction materials in the production of reaction products of this invention have resulted in products of indeterminate structure having substantially equivalent and permanent flameproofing characteristics.

The following example illustrates the reaction of an anhydrous $NH_3$—$P_2O_5$ reaction product with one-third the amount of ethylenediamine which would react where a large excess of ethylenediamine is employed as shown in Example I.

*Example IV*

One hundred grams of an anhydrous $NH_3$—$P_2O_5$ reaction product (commerical product "Victamide" produced by Victor Chemical Works) having an analysis of approximately 76.1% $P_2O_5$, 5.8% nuclear or amide nitrogen, and 12.7% ammonium nitrogen, were mixed with 29.2 grams of ethylenediamine (98% pure) and placed in a 500 ml. reaction flask and slowly heated over a period of 1½ hours to a temperature of 117–120° C. and held at this temperature for 3 hours. Evolution of ammonia took place over substantially the entire reaction period. The reaction product was then allowed to cool to room temperature and removed from the flask as a dry crumbly mass. After milling the product it was subjected to a vacuum for one hour to remove any traces of unreacted ethylenediamine.

The product was water-soluble and a 1% solution had a pH value of 7.6. Analysis showed 61.8% $P_2O_5$, 7.2% amino nitrogen and 3.8% ammonium nitrogen. Chromatographic examination (conducted in accordance with the above referred to procedure) of the product indicated a very complex composition having a phosphorus distribution corresponding with reference determinations for

| | Percent |
|---|---|
| Orthophosphate | 2.2 |
| Pyrophosphate | 2.8 |
| Tripolyphosphate | 6.8 |
| Tetraphosphate | 7.9 |
| Trimetaphosphate | 14.4 |
| Tetrametaphosphate | 11.5 |
| Pentaphosphate | 19.1 |
| Higher phosphate | 20.9 |
| Higher polymers | 14.4 |

No identification of the various components of the reaction product has been possible so the product must be designated as a reaction product.

The possible reaction products that I use for treating cellulosic material may vary over a wide range of compositions and structures, depending on the nature of the starting anhydrous ammonia-$P_2O_5$ and anhydrous ammonia-$POCl_3$ reaction products but have in common greatly improved flameproofing characteristics due to the condensation of ethylenediamine with from one-third to all of reactable amido groups present in the starting anhydrous ammonia-phosphoric acid anhydride reaction products.

In the flameproofing of cellulosic fabrics with these new compositions, it has been found that a more efficient flameproofing effect can be obtained by pretreating or mordanting the fabric prior to the flameproofing treatment.

Under this modified treatment the cotton fabric is placed in an aqueous tannic acid bath at a temperature of 165–175° F. for 30 minutes while maintaining gentle agitation. The fabric is removed from the acid bath and soaked in a water bath for 10–24 hours at room temperature, then transferred to an aqueous solution of antimony potassium tartrate [K(SbO)$C_2H_4O_6$·½$H_2O$, tartar emetic] and held at room temperature for 30 minutes. The cloth is removed from the tartar emetic solution and allowed to air dry. The strength of the tannic acid and tartar emetic solutions may be varied over a wide range. Concentrations within the range of 3% to 10% (by weight) for each of the reagents are quite satisfactory. Other acid mordantings reagents may be satisfactorily employed, such as the double salts of antimony fluoride and ammonium sulfate, antimony and sodium fluorides, antimono-potassium oxalate, antimony-calcium lactate, etc. However, the above described treatment represents that most commonly employed in the textile dyeing industry for the mordanting of cotton fibers and is preferred in the pretreatment of fibers for the flameproofing procedure of the present invention.

The mordant-treated cellulose fibers have a greater affinity for the organic amine substituted phosphorus-nitrogen compounds than the untreated cellulose fibers as evidenced by the greater permanence of the flameproofing effect.

In an example, an army twill cotton cloth, which was pretreated in the above manner with 3% solutions of the mordanting reagents, was treated with a 20% solution of the product of Example I and dried at 100-110° C. The cloth had an add-on of 26.8% of the flameproofing agent. After curing at 150° C. for 15 minutes, the fabric was rinsed in warm water for about 10 minutes and dried. The resulting fabric had a softness and feel ("hand") substantially equal to the original untreated fabric. On testing for flameproofness, the fabric, after 10 cycles of heavy duty washes, had a flame time of 12 seconds and a char length of 4.75 inches. This compares to a 12 second flame time, 10 inch char length for the same type fabric flameproofed without the mordant pretreatment and subjected to the 10 cycle heavy duty washes.

In a similar example using the same mordant pretreatment and flameproofing procedure, a dried fabric having an add-on of 23.7% and cured at 160° C. for 10 minutes was tested for flameproofness after 15 light duty wash cycles. The test showed a flame time of 7 seconds and a 5 inch char length. Under equivalent conditions of treatment in which the mordant pretreatment was omitted, the fabric, after 15 light duty wash cycles, showed a flame time of 12 seconds and a char length of 6 inches. Again, this shows an appreciable improvement in the flameproofing effect resulting from the combining of the mordant pretreatment with the flameproofing treatment.

In another example, a piece of the above mordant pretreated fabric was saturated with a 20% aqueous solution of the product of Example II, drained, and dried. The resulting fabric had an add-on of 17.2% of the flameproofing agent. After curing at 150° C. for 15 minutes the fabric was subjected to 10 light duty washing cycles and tested for degree of flameproofness. The flame time was 10 seconds and char length 4.5 inches. The char length was somewhat lower than the 5.25 inch char length for a similar fabric flameproofed without the mordant pretreatment but having a slightly higher original add-on (18.8% compared to 17.2%).

A piece of the above mordant pretreated fabric was saturated with a 20% aqueous solution of the product of Example III, drained, and dried. The resulting fabric had an add-on of 22.4%. After curing the treated fabric at 150° C. for 15 minutes, it was subjected to 10 light duty washing cycles and tested for degree of flameproofness. The flame time was 11 seconds and the char length 4.0 inches. In a duplicate example the add-on was 21.2% and after 15 light duty laundering cycles the flame time was 10 seconds with a char length of 4.5 inches.

In a further example using the mordant pretreated fabric and a 20% aqueous solution of the reaction product of Example IV, the add-on was 21.8%. After 10 light duty washing cycles the flame time was 11 seconds and the char length 5.0 inches. A duplicate example using a 23.6% add-on and 15 light duty washing cycles gave a flame test of 12 seconds burning time and 6 inch char length.

The degree of permanency of the flameproofing effect of the new compositions of my invention on cellulose fibers is dependent on the amount of the phosphorus compound retained by the fibers after repeated laundering cycles. While flame tests as reported above adequately show the permanency of the flameproofing effect, additional confirmation may be shown by analyzing the fibers before and after the washing cycles to determine the amount of phosphorus retained by the fibers. For example, an army cotton twill cloth was treated in the above described manner with a 27% add-on of the product of Example I. Analysis of the treated cloth after the initial water rinse showed a 2.54% phosphorus content and after 15 light duty washes the phosphorus content was 2.37%. This shows a 93.4% retention of phosphorus. Flame tests still showed an 11 second burning time with 4.5 inch char length.

Another piece of cloth which had received the premordant treatment was treated in the same manner. The initial add-on was 26.8%. After 15 light duty wash cycles, the phosphorus content of the fibers was reduced from 2.23% to 2.18%, thus showing a phosphorus retention of 97.7%. Flame tests showed a 10 second burning time and a 5 inch char length.

The retention of nitrogen after 15 light duty washes was 44.5% with mordant treated fibers and 30.7% with unmordanted cloth. This difference in nitrogen retention indicates a superior retention of the flameproofing agent by combining the mordant pretreatment with the flameproofing treatment.

In the preparation of the new compounds of this invention as illustrated in Example I to IV, above, I have found that the ethylenediamine reactant is the only alkylenepolyamine which will produce a reaction product having satisfactory degree of permanent flameproofing characteristics. For example, isopropylenediamine, 1,6-hexanediamine, monobutylamine, hydrazine, diethylenetriamine, tetraethylenepentamine, etc., react with anhydrous $NH_3$—$P_2O_5$ reaction products to give complex glass-like compositions which have very little value as permanent flameproofing agents for cellulosic fibers. This is contrary to what one might expect.

This application is a division of my application Ser. No. 768,041, filed October 20, 1958, now U.S. Patent 3,029,283.

The foregoing detailed description has been given for clearness of understanding only, and no unnecessary limitations should be understood therefrom, as modifications will be obvious to those skilled in the art.

I claim:

1. The method of flameproofing cellulose fibers comprising applying to cellulose fibers an aqueous solution of the condensation reaction product produced by reacting at a temperature above about 40° C. ethylenediamine in the liquid phase with the reaction product of anhydrous ammonia and a phosphoric acid anhydride selected from the group consisting of phosphorus pentoxide and phosphorus oxychloride and heating the mixture to cause the substantial evolution of ammonia, removing excess reaction product from said fibers, curing said fibers at about 125–170° C. to firmly secure said reaction product to the fibers, and removing excess unbonded reaction product from the fibers.

2. The method of flameproofing cellulose fibers comprising applying to cellulose fibers an aqueous solution of the condensation reaction product produced by reacting at a temperature above about 40° C. ethylenediamine in the liquid phase with the reaction product of anhydrous ammonia and a phosphoric acid anhydride selected from the group consisting of phosphorous pentoxide and phosphorus oxychloride having a total nitrogen to phosphorus atomic ratio of 1–3 to 1 and at least one amide nitrogen bonded directly to at least one phosphorus atom, and heating the mixture to cause the substantial evolution of ammonia, removing excess agent from said fibers, curing said impregnated fibers at about 125–170° C. to firmly bond said reaction product to the fibers, and removing excess unattached reaction product from the fibers.

3. The method of flameproofing cellulose fibers comprising applying to cellulose fibers an aqueous solution of a condensation reaction product produced by reacting at a temperature above about 40° C. ethylenediamine in the liquid phase with the reaction product of anhydrous ammonia and a phosphoric acid anhydride from the group consisting of phosphorus pentoxide and phosphorus oxychloride, wherein at least one-third of the reactive amido groups in said anhydrous ammonia-phosphoric anhydride reaction product have reacted with said ethylenediamine, and heating the mixture to cause the substantial evolution of ammonia, removing excess agent from said fibers and drying said fibers, curing said impregnated fibers at about 150–160° C. to firmly bond said reaction product to the fibers, and removing excess unattached reaction product from the fibers.

4. The flameproofed cellulose fibers produced by the method of claim 1.

5. The method of flameproofing cellulose fibers that have been pretreated with acid mordant comprising applying an aqueous solution of the condensation reaction product produced by reacting at a temperature above about 40° C. ethylenediamine in the liquid phase with the reaction product of anhydrous ammonia and a phosphoric acid anhydride selected from the group consisting of phosphorus pentoxide and phosphorus oxychloride, and heating the mixture to cause the substantial evolution of ammonia, removing excess reaction product from said fibers, curing said treated fibers at about 150–160° C. to firmly secure said reaction product to the fibers, and removing excess unbonded reaction product from the fibers.

6. The method of flameproofing cellulose fibers that have been pretreated with acid mordant comprising applying to the pretreated cellulose fibers an aqueous solution of the condensation reaction product produced by reacting at a temperature above about 40° C. ethylenediamine in the liquid phase with the reaction product of anhydrous ammonia and a phosphoric acid anhydride selected from the group consisting of phosphorus pentoxide and phosphorus oxychloride having a total nitrogen to phosphorus atomic ratio of 1–3 to 1 and at least one amide nitrogen bonded directly to at least one phosphorus atom and heating the mixture to cause the substantial evolution of ammonia, removing excess agent from said fibers, curing said impregnated fibers at about 125–170° C. to firmly bond said reaction product to the fibers, and removing excess unattached reaction product from the fibers.

7. The method of flameproofing cellulose fibers that have been pretreated with acid mordant comprising applying to the pretreated cellulose fibers an aqueous solution of the condensation reaction product produced by reacting at a temperature above about 40° C. ethylenediamine in the liquid phase with the reaction product of anhydrous ammonia and a phosphoric acid anhydride from the group consisting of phosphorus pentoxide and phosphorus oxychloride, wherein at least one-third of the reactive amido groups in said anhydrous ammonia-phosphoric anhydride reaction product have reacted with said ethylenediamine and heating the mixture to cause the substantial evolution of ammonia, removing excess agent from said fibers and drying said fibers, curing said impregnated fibers at about 150–160° C. to firmly bond said reaction product to the fibers, and removing excess unattached reaction product from the fibers.

8. The flameproofed cellulose fibers produced by the method of claim 5.

References Cited in the file of this patent

UNITED STATES PATENTS

| | | |
|---|---|---|
| 3,029,283 | Steinhauer | Apr. 10, 1962 |
| 3,034,919 | Steinhauer | May 15, 1962 |